United States Patent
Kasahara et al.

(10) Patent No.: US 7,890,773 B2
(45) Date of Patent: Feb. 15, 2011

(54) STORAGE MEDIUM CONVERSION METHOD, NON-TRANSITORY COMPUTER READABLE STORAGE MEDIUM AND DEVICE

(75) Inventors: Akihiro Kasahara, Sambu-gun (JP); Akira Miura, Sagamihara (JP); Hiroshi Suu, Chigasaki (JP); Kazunori Nakano, Tokyo (JP); Shigeru Ishida, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1020 days.

(21) Appl. No.: 11/559,419

(22) Filed: Nov. 14, 2006

(65) Prior Publication Data

US 2007/0100759 A1    May 3, 2007

Related U.S. Application Data

(63) Continuation of application No. PCT/JP2005/009540, filed on May 25, 2005.

(30) Foreign Application Priority Data

May 26, 2004    (JP)    .............................. 2004-156456

(51) Int. Cl.
*G06F 11/30*    (2006.01)
(52) U.S. Cl. ........................... 713/193; 380/44; 726/22
(58) Field of Classification Search ..................... 713/1, 713/2, 188, 194, 193; 380/200, 201, 255, 380/277, 44; 726/2, 22; 705/51
See application file for complete search history.

(56) References Cited

U.S. PATENT DOCUMENTS

| | | | |
|---|---|---|---|
| 7,096,504 B1 * | 8/2006 | Tagawa et al. ................ 726/27 |
| 7,137,025 B2 * | 11/2006 | Ito et al. ...................... 713/600 |
| 7,159,244 B2 * | 1/2007 | Matsushima et al. ........... 726/30 |
| 7,162,647 B2 * | 1/2007 | Osaki ......................... 713/193 |
| 7,200,668 B2 * | 4/2007 | Mak et al. .................... 709/230 |
| 7,203,314 B1 * | 4/2007 | Kahn et al. .................. 380/239 |
| 7,373,506 B2 * | 5/2008 | Asano et al. ................. 713/168 |
| 7,478,432 B2 * | 1/2009 | Echizen et al. ................ 726/26 |

(Continued)

FOREIGN PATENT DOCUMENTS

EP    1 416 406 A1    5/2004

(Continued)

OTHER PUBLICATIONS

Makoto Tatebayashi, et al. (Mokoto Kanrin, et al. On International Search Report), "Content Protection System for Recordable Media", Matsushita Electric Industrial Co., Ltd., Sep. 7, 2000, pp. 367 to 368.

(Continued)

*Primary Examiner*—Kimyen Vu
*Assistant Examiner*—Joseph Pan
(74) *Attorney, Agent, or Firm*—Oblon, Spivak, McClelland, Maier & Neustadt, L.L.P.

(57) ABSTRACT

A user terminal converts stored contents of an SD card to contain second encrypted content key data equivalent to an encrypted title key of SD Audio, and encrypted content equivalent to encrypted content of the SD Audio. Accordingly, compatibility can be realized between an encryption dual key system as a first encryption system and an encryption (single) key system as a second encryption system.

19 Claims, 10 Drawing Sheets

U.S. PATENT DOCUMENTS

| | | | |
|---|---|---|---|
| 2002/0091643 A1* | 7/2002 | Okamoto et al. | 705/53 |
| 2002/0129235 A1* | 9/2002 | Okamoto et al. | 713/150 |
| 2002/0169971 A1* | 11/2002 | Asano et al. | 713/193 |
| 2002/0186842 A1 | 12/2002 | Sabet-Sharghi et al. | |
| 2005/0120232 A1* | 6/2005 | Hori et al. | 713/193 |
| 2005/0125357 A1* | 6/2005 | Saadat et al. | 705/57 |

FOREIGN PATENT DOCUMENTS

| | | |
|---|---|---|
| JP | 2000-98885 | 4/2000 |
| JP | 2000-115153 | 4/2000 |
| JP | 2000-357370 | 12/2000 |
| JP | 2001-256113 | 9/2001 |
| JP | 2003-122637 | 4/2003 |

OTHER PUBLICATIONS

Toru Kambayashi, et al. (Tatsu Uebayashi, et al. on International Search Report), "Content Protection for SD Memory Card", Toshiba Review, vol. 58, No. 6, Jun. 1, 2003, pp. 32 to 35.

4C Entity, LLC, "Welcome to 4C Entity—Announcements", http://www.4centity.com/, Oct. 10, 2006.

Toshiba Corporation, "Toshiba's SD-Card-Based Digital Rights Management System Opens up Full Potential of Digital Content Distribution Market", Internet Citation, Jul. 17, 2003, pp. 1-2, XP007913160.

* cited by examiner

STORAGE MEDIUM CONVERSION METHOD, NON-TRANSITORY COMPUTER READABLE STORAGE MEDIUM AND DEVICE

CROSS-REFERENCE TO RELATED APPLICATIONS

This is a Continuation Application of PCT Application No. PCT/JP2005/009540, filed May 25, 2005, which was published under PCT Article 21(2) in Japanese.

This application is based upon and claims the benefit of priority from prior Japanese Patent Application No. 2004-156456, filed May 26, 2004, the entire contents of which are incorporated herein by reference.

BACKGROUND OF THE INVENTION

1. Field of the Invention

The present invention relates to a storage medium conversion method, a program and a device capable of converting stored contents of a first storage medium so that the first storage medium compliant with an encryption dual key system such as MQbic (registered trademark) can comply with an encryption (single) key system such as SD audio.

2. Description of the Related Art

Recently, development of the information society has been accompanied by widespread use of a content distribution system which distributes content of computerized books, newspapers, music or moving images (simply referred to as content hereinafter) to user terminals to enable reading of the content.

However, as this content can be easily copied, illegal actions ignoring a copyright easily occur. Accordingly, from the standpoint of protecting the content from the illegal actions, the content is usually encrypted by an encryption key to be recorded, and decrypted during playback. As a content protection technology of this type, Content protection for prerecorded media (CPPM) is available. For example, a standardized encryption key system such as SD-Audio, SD-video or SD-ePublish (SD electronic publishing) is used (e.g., see 4C Entity, LLC, <URL: http://www.4Centity.com/>).

Figure 1:
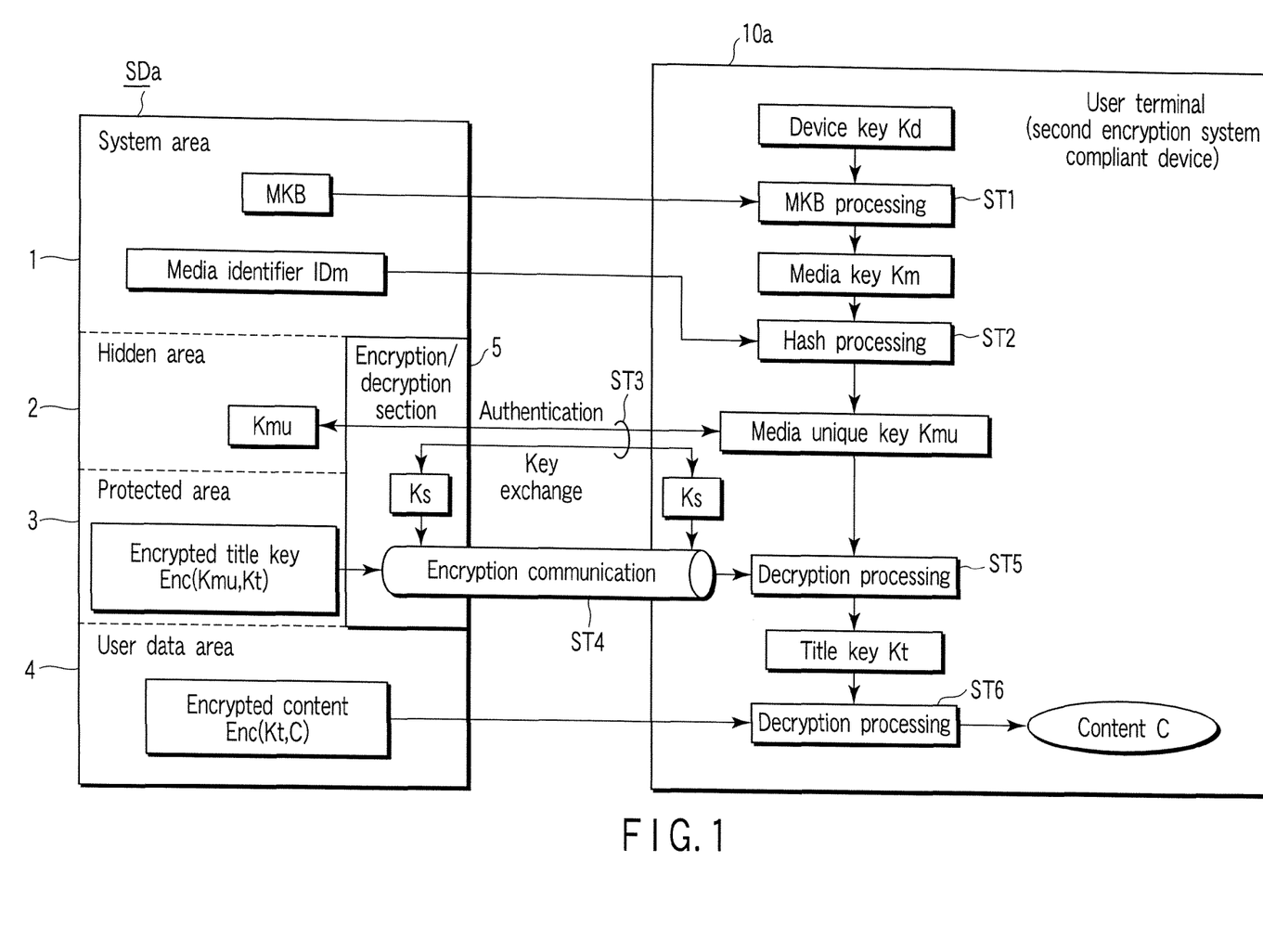
FIG. 1 is a schematic diagram showing a configuration of an SD card and a user terminal corresponding to a conventional encryption key system.

FIG. 1 is a schematic diagram showing a configuration of an SD card and a user terminal corresponding to the encryption key system. The SD card SDa is an example of a secure storage medium which stores data to be secure. An index a of the SD card SDa denotes correspondence to an SD audio standard. Not limited to this, however, it can correspond to all currently defined SD monomedia standards such as an SD video standard and an SD epublish standard.

The SD card SDa includes a system area 1, a hidden area 2, a protected area 3, a user data area 4, and an encryption/decryption section 5. Data is stored in each of areas 1 to 4 corresponding to the SD Audio standard.

Specifically, key management information MKB (media key block) and a media identifier IDm are stored in the system area 1. A media unique key Kmu is stored in the hidden area 2. An encrypted title key Enc (Kmum, Kt) is stored in the protected area 3. Encrypted content Enc (Kt, C) is stored in the user data area 4. A notation of Enc (A, B) means data B encrypted by data A in the description.

The system area 1 is a read-only area to be accessed from the outside of the SD card. The hidden area 2 is a read-only area to be referred to by the encryption/decryption section 5 of the SD card, and all access from the outside is inhibited. The protected area 3 is an area to enable reading/writing from the outside of the SD card when authentication succeeds. The user area 4 is an area to enable free reading/writing from the outside of the SD card. The encryption/decryption section 5 has an encrypting/decrypting function of executing authentication, key exchange or encryption communication between the protected area 3 and the outside of the SD card.

With respect to the SD card SDa, a playback user terminal 10a logically operates as follows. The user terminal 10a subjects key management information MKB read from the system area 1 of the SD card SDa to MKB processing by a preset device key Kd (ST1) to obtain a media key Km. Next, the user terminal 10a executes hash processing based on the media key Km and a media identifier IDm read from the system area 1 of the SD card SDa (ST2) to obtain a media unique key Kmu.

Subsequently, based on the media unique key Kmu, the user terminal 10a executes authentication key exchange (AKE) with the encryption/decryption section 5 of the SD card SDa (ST3) to share a session key Ks with the SD card SDa. The authentication key exchange processing of the step ST3 succeeds when the media unique key Kmu of the hidden area 2 referred to by the encryption/decryption section 5 and the media unique key Kmu generated by the user terminal 10a matches each other, and the session key Ks is shared.

Then, the user terminal 10a reads an encrypted title key Enc (Kmu, Kt) from the protected area 3 via encryption communication using the session key Ks (ST4). The user terminal 10a decrypts the encrypted title key Enc (Kmu, Kt) by the media unique key Kmu (ST5) to obtain a title key Kt.

Lastly, the user terminal 10a decrypts encrypted content Enc (Kt, C) read from the user area 4 by the title key Kt (ST6) to play the obtained content C.

According to the above encryption key system, the title key Kt is singly encrypted by the media unique key Kmu. On the other hand, an encryption dual key system in which a content key Kc (=title key Kt) is dually encrypted by a user key Ku and a media unique key Kmu below has been proposed. For example, the encryption dual key system of this type is used for MQbic (registered trademark).

Figure 2:
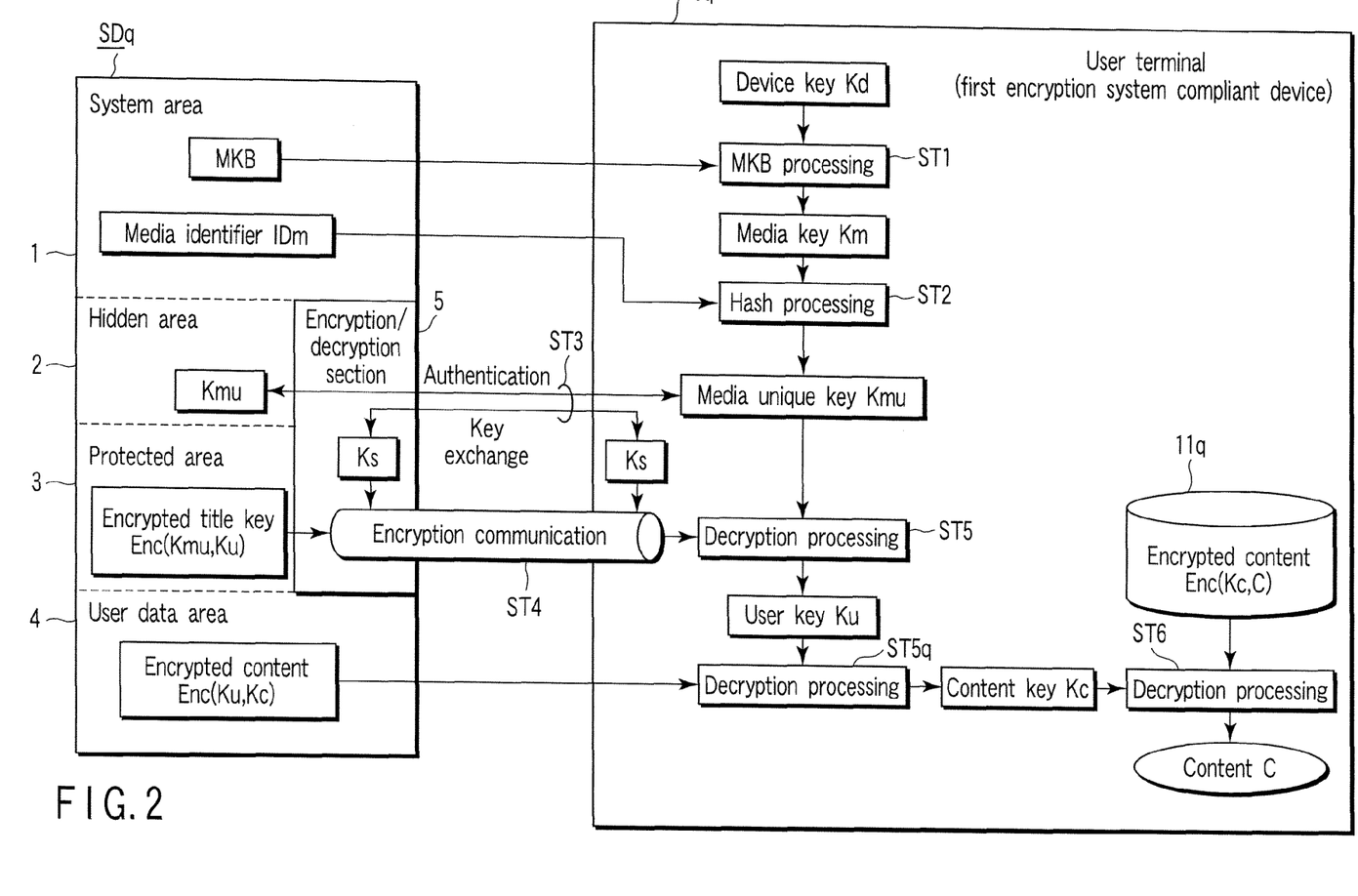
FIG. 2 is a schematic diagram showing a configuration of an SD card and a user terminal corresponding to a conventional encryption dual key system.

FIG. 2 is a schematic diagram showing a configuration of an SD card and a user terminal corresponding to the encryption dual key system, and different from FIG. 1 in the following three points (i) to (iii).

(i) A first point is that an encrypted user key Enc (Kmu, Ku) is stored in place of the encrypted title key in the protected area 3. The user key Ku is an encryption/decryption key for the content key Kc, and commonly used for a plurality of encrypted content key Enc (Ku, KC1), Enc (Ky, Kc2), . . . in the same SD card SDq. An index q of the SD card SDq indicates correspondence to MQbic (registered trademark).

(ii) A second point is that an encrypted content key Enc (Ky, Kc) is stored in place of the encrypted content in the user data area 4. On the other hand, the encrypted content may be stored in an external storage medium, not limited in a memory 11q of a user terminal 10q.

(iii) A third point is that between steps ST5 and ST6, decryption processing (ST5q) is executed to obtain a content key (=title key) Kc by decrypting the encrypted content key based on a decryption result (user key Ku) by the media unique key Kmu.

Because of the difference of the above three points, the SD card SDq and the user terminal 10q of FIG. 2 operate in steps ST1 to ST3 as in the case of FIG. 1, but operates as follows in step ST4 and after.

The user terminal 10q reads the encrypted user key Enc (Kmu, Ku) from the protected area 3 via encryption communication using the session key Ks (ST4). The user terminal 10$q$ decrypts the encrypted user key Enc (Kmu, Ku) by the media unique key Kmu (St5) to obtain a user key Ku.

Then, the user terminal 10$q$ decrypts the encrypted content key Enc (Ku, Kc) read from the user data area 4 (ST5) to obtain a content key Kc.

Lastly, the user terminal 10$a$ decrypts the encrypted content Enc (Kc, C) read from the memory 11$q$ by the content key Kc (ST6) to play the obtained content C.

As the above encryption dual key system holds the encrypted content key in the user data area 4 larger in storage capacity than the protected area 3, there is an advantage that a greater volume of encrypted content keys can be held than the SD Audio. Moreover, according to the encryption dual key system, the encrypted content can be held outside the SD card. Thus, it is expected that distribution of the encrypted content will be promoted.

BRIEF SUMMARY OF THE INVENTION

However, the foregoing encryption dual key system has no compatibility to other encryption (single) key system (may be simply referred to as the other system hereinafter). For example, the user terminal 10$q$ compliant with the encryption dual key system can play content. On the other hand, the user terminal 10$a$ compliant with the other system cannot play content.

The encryption dual key system itself has no problems even if it has no compatibility to the other system. However, from the standpoint of letting the user use the user terminal 10$a$ of the other system instead of discarding it, there should preferably be compatibility.

An object of the present invention is to provide a storage medium conversion method capable of realizing compatibility between an encryption dual key system and the other encryption (single) key system, a program, and a device.

A first aspect of the present invention is a storage medium conversion method for causing a user terminal to convert stored contents of a first storage medium in a manner of providing compatibility between, a first encryption system which uses the first storage medium for prestoring media identifier data, media unique key data generated based on the media identifier data, encrypted user key data obtained by encrypting user key data in a decryptable manner based on the media unique key data, and first encrypted content key data obtained by encrypting content key data in a decryptable manner based on the user key data, and the user terminal for storing first encrypted content obtained by encrypting content data in a decryptable manner based on the content key data, and a second encryption system which uses a second storage medium for storing, different from the first encryption system, encrypted title key data obtained by encrypting title key data equivalent to the content key data in a decryptable manner based on the media unique key data, and second encrypted content obtained by encrypting the content data in a decryptable manner based on the title key data, the method comprising: generating the media unique key data based on the media identifier data read from the first storage medium; decrypting the encrypted user key data read from the first storage medium based on the media unique key data to obtain user key data; decrypting the first encrypted content key data read from the first storage medium based on the user key data to obtain content key data; encrypting the content key data in a decryptable manner based on the media unique key data, thereby obtaining second encrypted content key data equivalent to the encrypted title key data; writing the second encrypted content key data in the first storage medium; and writing the first encrypted content in the first storage medium.

A second aspect of the present invention is a program used for the storage medium conversion method of the first aspect to cause the computer of the user terminal to function as means for executing the above steps.

A third aspect of the present invention is an electronic device capable of decrypting content encrypted based on content key data, comprising: a holding device configured to detachably hold a storage medium having a first area for storing media identifier data, a second area for storing media unique key data generated in connection with the media identifier data, a third area for storing encrypted user key data obtained by encrypting user key data in a decryptable manner based on the media unique key data, and a fourth area for storing content key data encrypted based on the user key data; a first writing device configured to write content encrypted based on the content key data in the fourth area of the storage medium; a second writing device configured to write the content key data encrypted based on the media unique key data generated in connection with the media identifier data in the third area in response to the writing by the first writing device; a first deleting device configured to delete the encrypted content in the fourth area by an operation from the outside; and a second deleting device configured to delete the content key data encrypted based on the media unique key data from the third area in response to the deletion by the first deleting device.

According to the first and second aspects, upon acquisition of the second encrypted content key data equivalent to the encrypted title key of the second storage medium from the stored contents of the first storage medium, the user terminal writes this second encrypted content key data in the first storage medium. The user terminal writes the prestored first encrypted content in the first storage medium. The first encrypted content is equivalent to second encrypted content as it can be decrypted by content key data equivalent to the encrypted title key of the second encryption system.

In short, the user terminal converts the stored contents of the first storage medium to contain the second encrypted content key data equivalent to the encrypted title key of the second storage medium and the first encrypted content equivalent to the second encrypted content of the second storage medium.

Thus, according to the first and second aspects, as the stored contents of the first storage medium are converted to substantially contain the stored content of the second storage medium, it is possible to realize compatibility between the encryption dual key system as the first encryption system and the other encryption (single) key system as the second encryption system.

According to the third aspect, when the first writing device writes the content encrypted by the content key data in the storage medium, the second writing device writes the content key encrypted by the media unique key data. The storage medium before writing corresponds to the first encryption system. The storage medium after writing corresponds to the first and second encryption systems.

Thus, according to the third aspect, similarly to the above case, it is possible to realize compatibility between the encryption dual key system as the first encryption system and the other encryption (single) key system as the second encryption system. Additionally, according to the third aspect, in response to writing or deleting of the encrypted content, the encrypted content key is written or deleted. In other words, according to the third aspect, in addition to the realization of compatibility, as compatibility is provided or canceled in response to writing or deletion of the encrypted content, it is possible to improve convenience.

DETAILED DESCRIPTION OF THE INVENTION

The embodiments of the present invention will be described below with reference to the accompanying drawings.

First Embodiment

The embodiments of the present invention will be described below with reference to the drawings.

Figure 3:
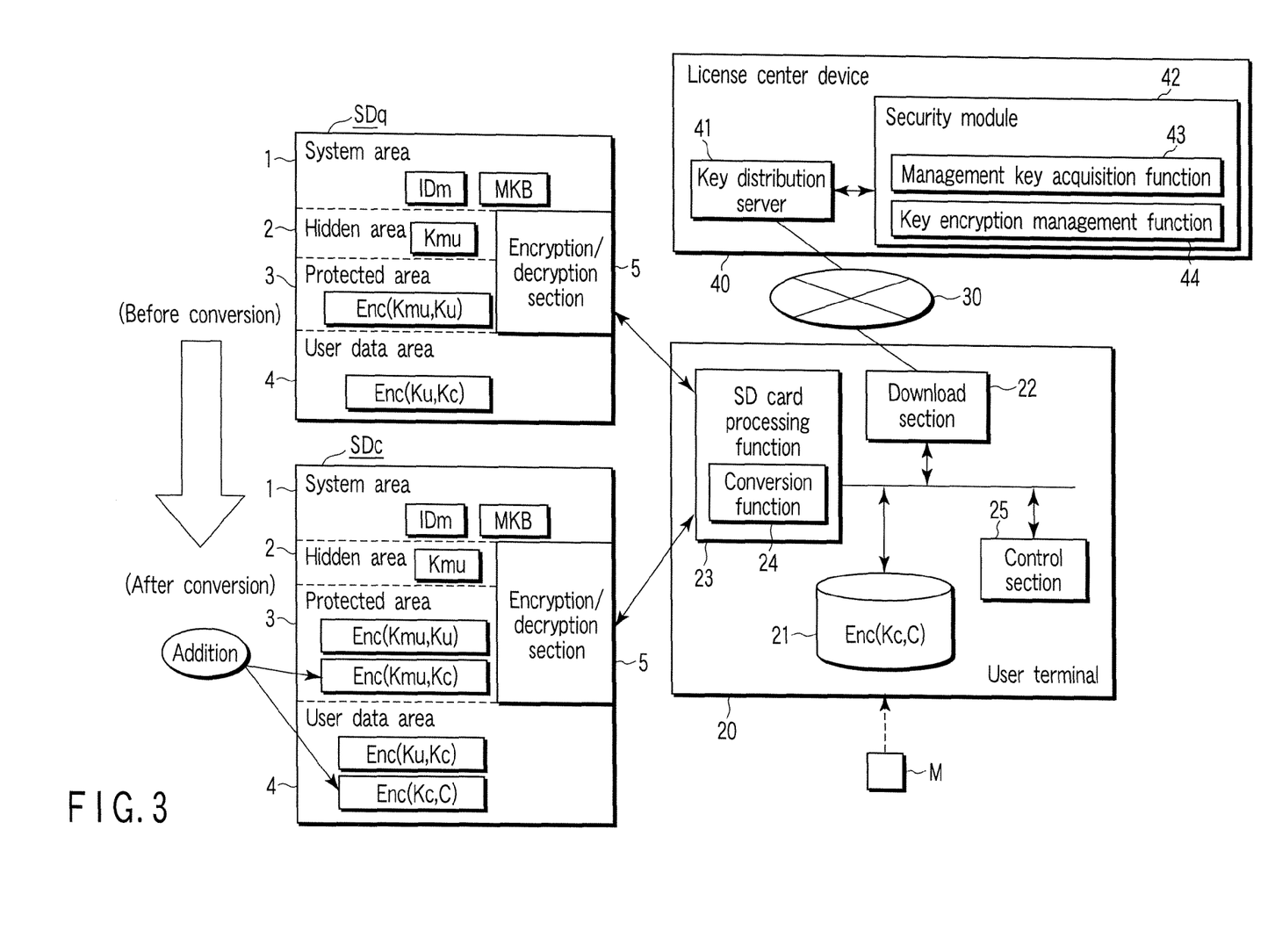
FIG. 3 is a schematic diagram showing a configuration of a storage medium conversion system applied to a storage medium conversion method according to a first embodiment of the present invention.
Figure 4:
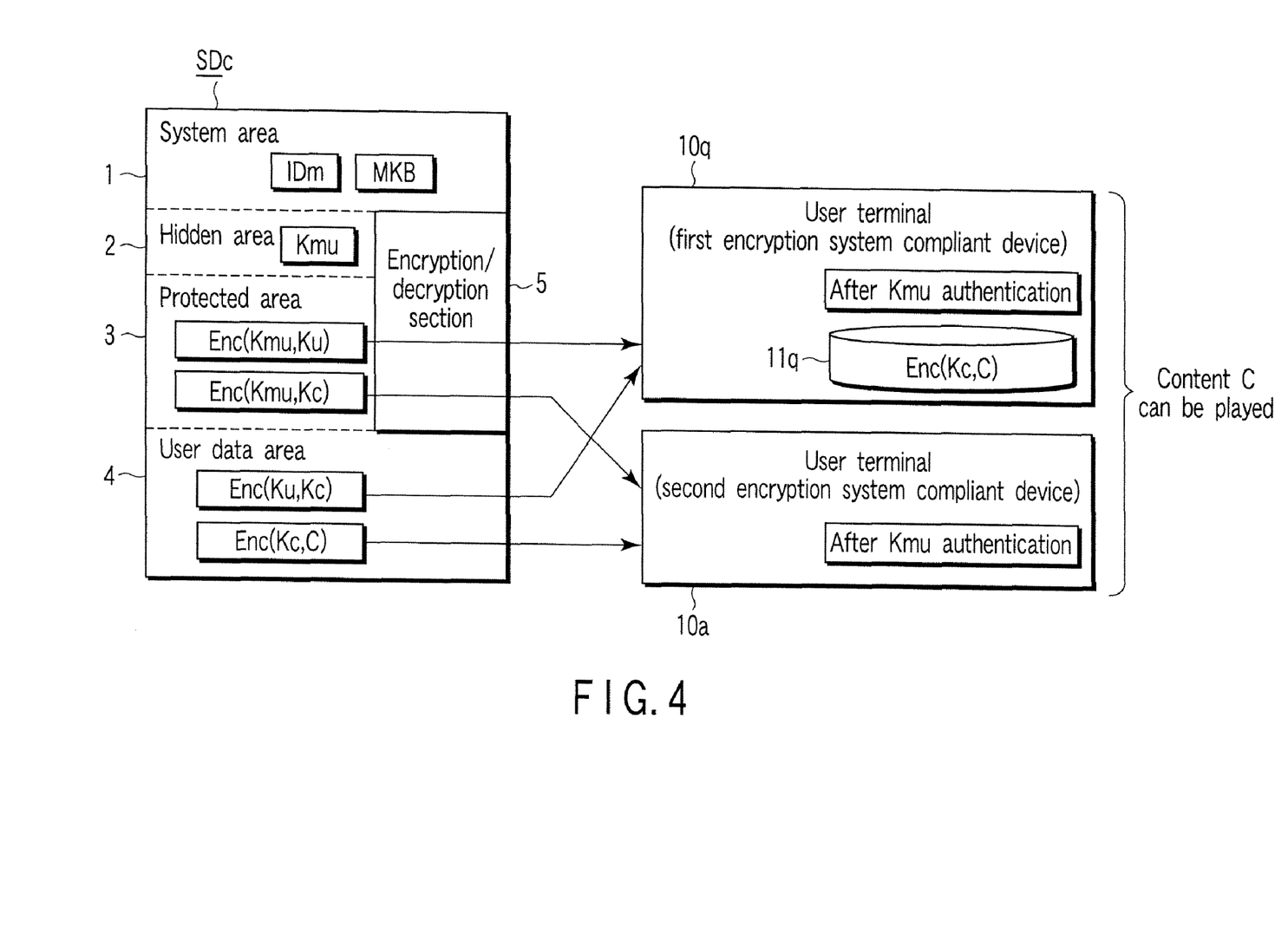
FIG. 4 is a schematic diagram showing compatibility according to the embodiment.

FIG. 3 is a schematic diagram showing a configuration of a storage medium conversion system applied to a storage medium conversion method according to a first embodiment of the present invention. FIG. 4 is a schematic diagram showing compatibility according to the embodiment. Portions similar to those of FIGS. 1 and 2 are denoted by similar reference numerals, and detailed description thereof will be omitted. Different portions will mainly be described below. Similarly, repeated explanations will be avoided for the embodiments.

That is, according to the embodiment, stored contents of the SC card (first storage medium) SDq of the first encryption system as the encryption dual key system shown in FIG. 2 are converted to contain the stored contents of the SD card (second storage medium) SDa of the second encryption system as the encryption (single) key system shown in FIG. 1. Thus, according to the embodiment, an SD card SDc having compatibility between the two systems is obtained as shown in FIGS. 3 and 4.

For example, when using the SD card SDc, a user terminal 10q of the first encryption system decrypts an encrypted user key Enc (Kmu, Ku)) based on a media unique key Kmu after authenticating of the media unique key Kmu, decrypts an encrypted content key Enc (Ku, Kc) based on an obtained user key Ku, and decrypts encrypted content Enc (Kc, C) in a memory 11q based on the an obtained content key Kc. On the other hand, when using the SD card SDc, a user terminal 10a of the second encryption system decrypts encrypted content key Enc (Kmu, Kc) based on the media unique key Kmu after authenticating of the media unique key Kmu, and decrypts the encrypted content Enc (Kc, C) based on an obtained content key Kc. In other words, the SD card SDc after conversion can be used by the user terminals 10q, 10a of both systems, and provided with compatibility. An index c of the SD card SDc indicates a converted state.

Specifically, according to the system of the embodiment, the user terminal 20 for detachably holding the SD card SDq can communicate with a license center device 40 via a network 30.

The SD card SDq includes areas 1 to 4 and an encryption/decryption section 5 of the above functions. In the system area 1, key management information MKB and media identifier IDm are stored. In the hidden area 2, a media unique key Kmu is stored. In the protected area 3, an encrypted user key Enc (Kmu, Ku) is stored. In the user data area 4, an encrypted content key Enc (Ku, Kc) is stored. For this SD card SDq, stored contents are converted by the user terminal 20, and the card is converted into an SD card SDc.

The user terminal 20 includes a memory 21, a download section 22, an SD card processing function 23, a conversion function 24, and a control section 25. For the user terminal 20, any optional device can be used as long as it is an electronic device such as a personal computer, a cellular phone or a personal digital assistant (PDA) for detachably holding the SD card SDq.

The memory 21 is a storage area in which reading/writing can be executed from the other sections 22 to 25, and stores encrypted content Enc (Kc, C).

The download section 22 is controlled by the control section 25, has a function of downloading an encrypted content key Enc (Ku, Kc) from the license center device 40, and can use, e.g., a browser or the like.

The SD card processing function 23 is controlled by the control section 25, and has an authentication function with the SD card SDq, an encryption communication function, and a function of reading/writing stored contents of the area 1, 3 and 4.

The conversion function 24 is a part of the SD card processing function 23, and has a function of converting stored contents of the SD card SDq and additionally writing or deleting an obtained result to/from the SD card SDq. The SD card processing function and the conversion function 24 can be realized by a software configuration or a combination of a hardware configuration with the software configuration. The portion of the software configuration is realized by installing a program for realizing the functions 23, 24 from a computer readable storage medium M or a network into a computer of the user terminal 20 beforehand.

The control section 25 has a normal computer function and a function of controlling the other sections 21 to 24 in accordance with user's operation.

The license center device 30 includes a key distribution server 41, a security module 42, a management key acquisition function 43, and a key encryption management function 44.

The key distribution server 41 has a function of accessing the security module 42 based on a transmission request received from the user terminal 20 via a network 30, and returning obtained encrypted content key data and metadata to the user terminal 20 via the network 30.

The security module 42 is a device for executing encryption/decryption processing of a user key and a content key.

The security module 42 includes a management key acquisition function 43 and a key encryption management function 44.

The management key acquisition function 43 holds a management key to enable reading from the key distribution server 41.

The key encryption management function 44 has the following functions (44/1) to (44/3): (44/1) a function of setting a management key from the key distribution server 41; (44/2) a function of decrypting a management encrypted user key and a management encrypted content key received from the key distribution server 41 based on this management key to obtain a user key and a content key; and (44/3) a function of encrypting the content key and basic metadata by the user key, and transmitting the obtained encrypted content key (containing basic metadata) and (additional) metadata such as purchase date to the key distribution server 41.

Figure 5:
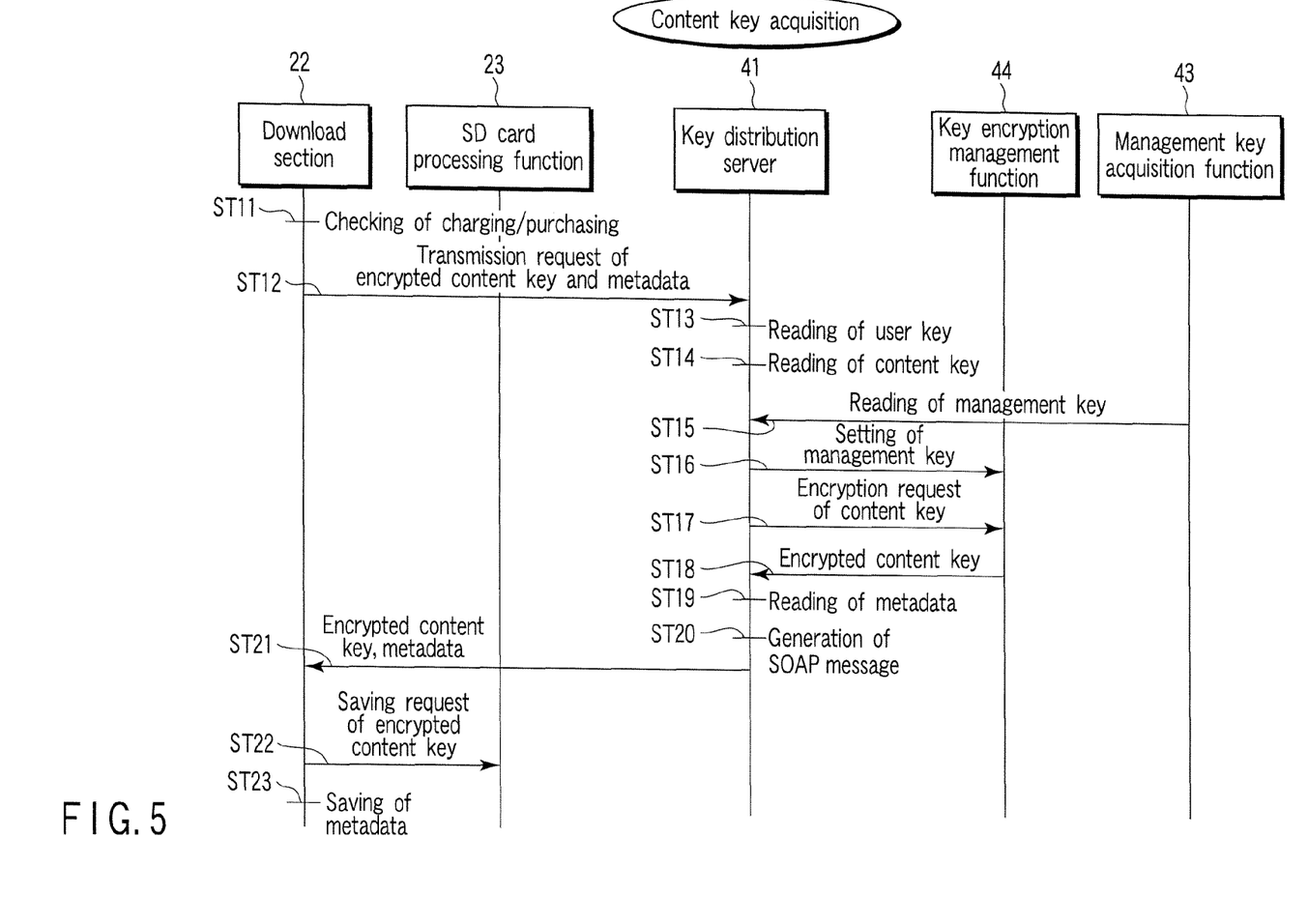
FIG. 5 is a sequential diagram showing acquisition processing of content key according to the embodiment.
Figure 6:
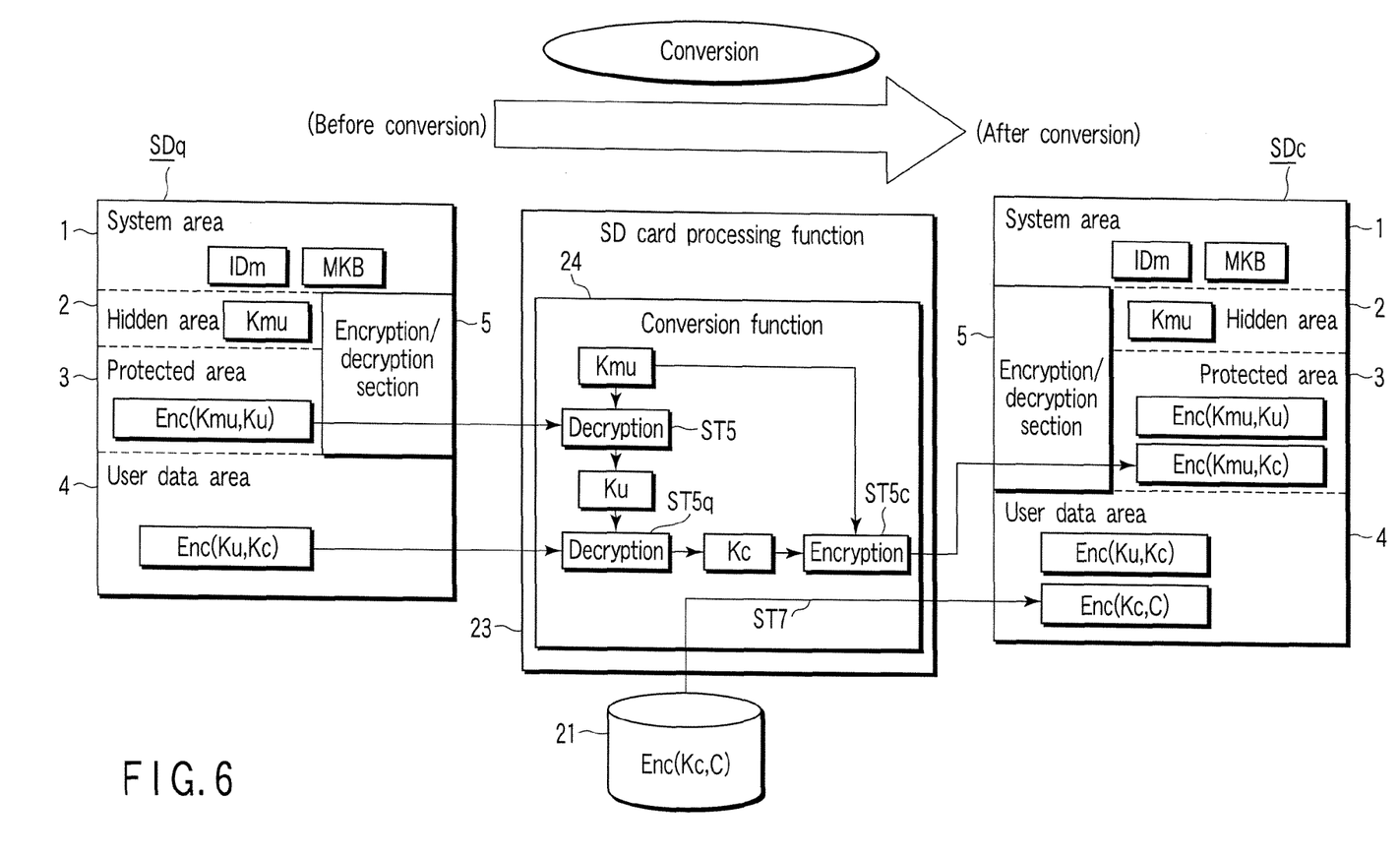
FIG. 6 is an explanatory schematic diagram showing conversion processing according to the embodiment.

Next, the storage medium conversion method of the storage medium conversion system thus configured will be described by referring to FIGS. 5 to 7. First, acquisition processing of the content key will be described, and then conversion processing and reverse conversion processing of the storage medium will be described.

(Acquisition Processing of Content Key)

In the user terminal 20, the control section 25 starts the download section 22 by user's operation. As shown in FIG. 5, the download section 22 checks whether a content key has been bought or charged (ST1). If the content key has not been bought, the user terminal 20 executes content key buying and settling processing with the license center device 40 to set the content key in a bought or charged state.

Subsequently, the download section 22 transmits a transmission request of an encrypted content key and metadata to be obtained to the key distribution server 41 (ST12). This transmission request contains at least a content ID corresponding to the encrypted content key and a media identifier IDm of the SD card SDq.

Upon reception of the transmission request, the key distribution server 41 reads a management encrypted user key prestored for each media identifier IDm from a user key database (not shown) (ST13), and a management encrypted content key and basic metadata (content ID, title, creator, and others) prestored for each content ID from a content key database (not shown) (ST14).

Upon reading of the management key from the management key acquisition function 43 (ST15), the key distribution server 41 sets this management key in the key encryption management function 44 (ST16). The key distribution server 41 transmits an encryption request of the content key to the key encryption management function 44 (ST17). This encryption request contains the management encrypted user key, the management encryption content key, and the basic metadata.

The key encryption management function 44 decrypts the management encrypted user key and the management encryption content key based on a management key to obtain a user key and a content key. Then, the key encryption management function 44 encrypts the content key and the basic metadata by the user key, and transmits the obtained encrypted content key (containing basic metadata) and (additional) metadata such as a purchase date to the key distribution server 41 (ST18).

Upon reading of the additional metadata (ST19), the key distribution server 41 generates, e.g., a simple object access protocol (SOAP) message containing the encrypted content key and the metadata (ST20). The key distribution server 41 transmits the encrypted content key and the metadata through the SOAP message to the user terminal 20 (ST21). The SOAP message is an example of a message system and, needless to say, it may be changed to another system.

In the user terminal 20, the download section 22 that has received the SOAP message sends a saving request of the encrypted content key to the SD card processing function 23. The saving request of the encrypted content key contains the encrypted content key alone of the encrypted content key and the metadata. The SD card processing function 23 writes this encrypted content key in the user data area 4 of the SD card SDq.

The download section 22 saves the metadata not sent to the SD card processing function 23 (ST23). Thus, the acquisition processing of the content key is finished.

(Conversion Processing of Storage Medium)

Upon writing of the encrypted content key in the user data area 4 of the SD card SDq in step ST22, the SD card processing function 23 starts the conversion function 24 to execute conversion processing of the SD card SDq.

The conversion function 24 first executes steps ST1 to ST5$q$ as in the above case.

That is, as shown in FIG. 2, the conversion function 24 subjects key management information MKB read from the system area 1 of the SD card SDq to MKB processing by a preset device key Kd (ST1) to obtain a media key Km. The conversion function 24 subjects both of the media key Km and the media identifier IDm read from the system area 1 of the SD card SDq to hash processing (ST2) to generate a media unique key Kmu.

The conversion function 24 executes authentication and key exchange processing with the encryption/decryption section 5 of the SD card SDq (ST3) to share a session key Ks with the SD card SD1.

The conversion function 24 reads an encrypted user key Enc (Kmu, Ku) from the protected area 3 via encryption communication using a session key Ks (ST4). The conversion section 24 decrypts this encrypted user key Enc (Kmu, Ku) by the media unique key Kmu (ST5) to obtain a user key Ku.

The conversion function 24 reads the encrypted content key Enc (Ku, Kc) from the user data area 4 of the SD card SDq. The conversion function 24 decrypts the encrypted content key Enc (Ku, Kc) by the user key Ku (ST5$q$) to obtain a content key Kc.

The above is similar to the previously described processing. Next, as shown in FIG. 6, the conversion function 24 executes new processing. That is, the conversion function 24 updates usage rule information (usage rule) regarding copying and moving contained in the content key Kc to indicate copying inhibition and moving inhibition. The conversion function 24 encrypts the updated content key Kc in a decryptable manner by the media unique key Kmu to obtain a second encrypted content key Enc (Kmu, Kc) equivalent to an encrypted title key (ST5$c$). The updating of the usage rule information may properly be omitted or changed.

Subsequently, the conversion function 24 writes the second encrypted content key Enc (Kmu, Kc) in the protected area 3 of the SD card SDq via the encryption/decryption section 5.

When the number of encrypted content keys Enc (Kmu, Kc') or data amount stored in the SD card SDq reaches a reference value before the writing, the conversion function 24 may delete the encrypted content key Enc (Kmu, Kc) stored first in the protected area 3.

The conversion function 24 writes the encrypted content Enc (Kc, C) of the memory 21 in the user data area 4 of the SD card SDq.

Upon completion of writing of the second encrypted content key Enc (Kmu, Kc) and the encrypted content Enc (Kc, C), as shown in FIG. 4, the SD card SDq is converted into an SD card SDc having compatibility with the SD Audio.

(Reverse Conversion/Deletion of Storage Medium)

Figure 7:
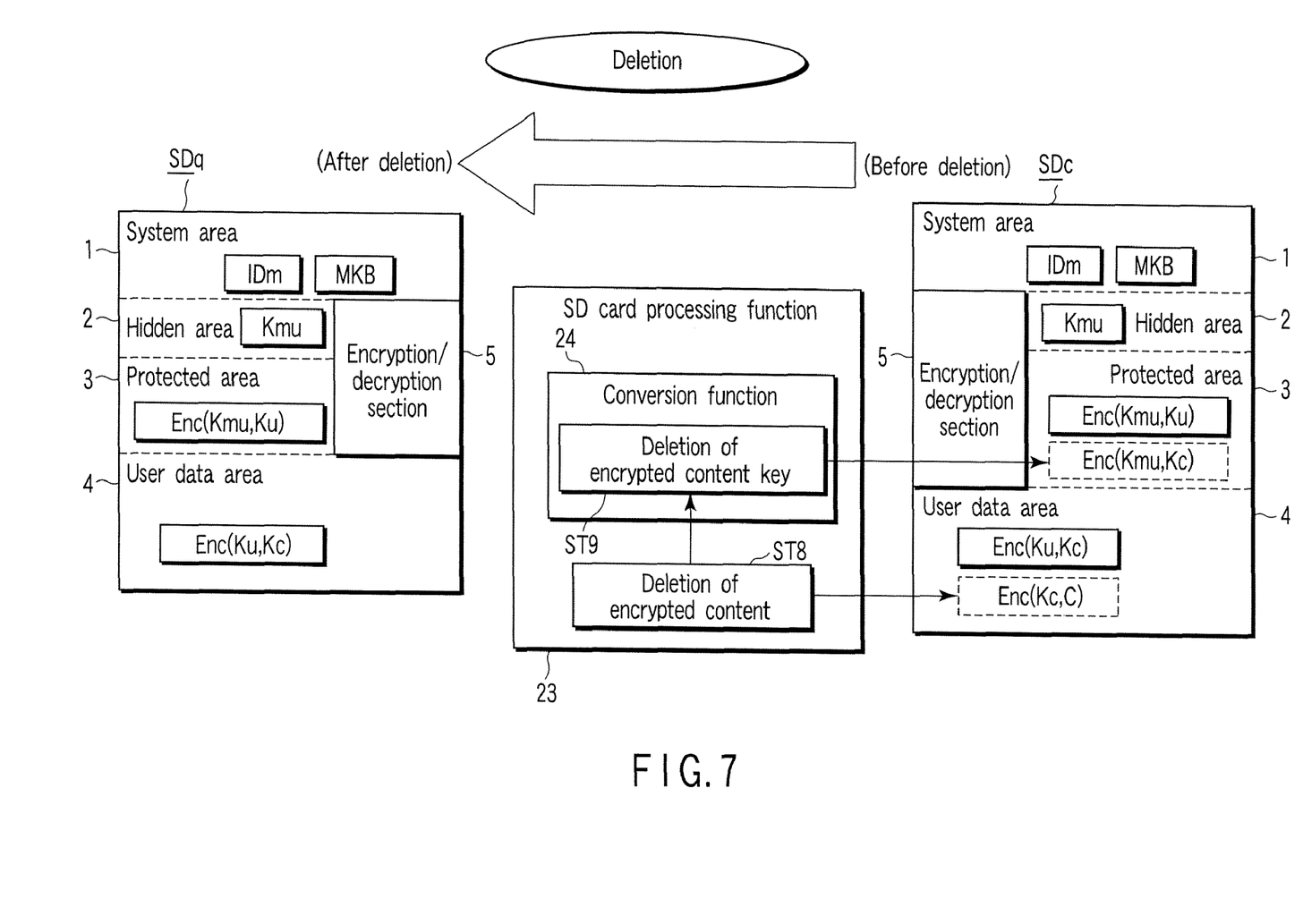
FIG. 7 is an explanatory schematic diagram showing deletion processing according to the embodiment.

As shown in FIG. 7, upon selection of content to be deleted by user's operation, the conversion function 24 deletes the second encrypted content key Enc (Kmu, Kc) and the encrypted content Enc (Kc, C) from the SD card SDc (ST8 to ST9) corresponding to the selected content.

Alternatively, upon deletion of the encrypted content Enc (Kc, C) from the SD card SDc by user's operation (ST8), the conversion function 24 can delete the second encrypted content key Enc (Kmu, Kc) from the SD card SDc in accordance with the deletion (ST9).

In any case, when compatibility with the SD Audio is removed, the conversion function 24 deletes the second encrypted content key Enc (Kmu, Kc) and the encrypted content Enc (Kc, C). However, when the compatibility with the SD Audio is removed, the conversion function 24 does not delete the encrypted content key Enc (Ku, Kc) of the encryption dual key system.

As described above, according to the embodiment, the user terminal 20 converts the stored contents of the SD card SDq to contain the second encrypted content key data Enc (Kmu, Kc) equivalent to the encrypted title key of the SD Audio and the encrypted content Enc (Kc, C) equivalent to the encrypted content of the SD Audio. Thus, it is possible to realize compatibility between the encryption dual key system as the first encryption system (MQbic [registered trademark]) and the other encryption (single) key system as the second encryption system (SD Audio). As descried above, all the SD monomedia standards are applied to the second encryption system, not limited to the SD Audio. Hence, according to the embodiment, it is possible to realize compatibility with all the SD monomedia standards.

Second Embodiment

Next, a storage conversion method according to a second embodiment of the present invention will be described.

This embodiment is a modified example of the first embodiment in which a conversion start method is changed. That is, according to the first embodiment, the conversion is started when the encrypted content key is downloaded. On the other hand, according to this embodiment, conversion is started by user's selection.

Figure 8:
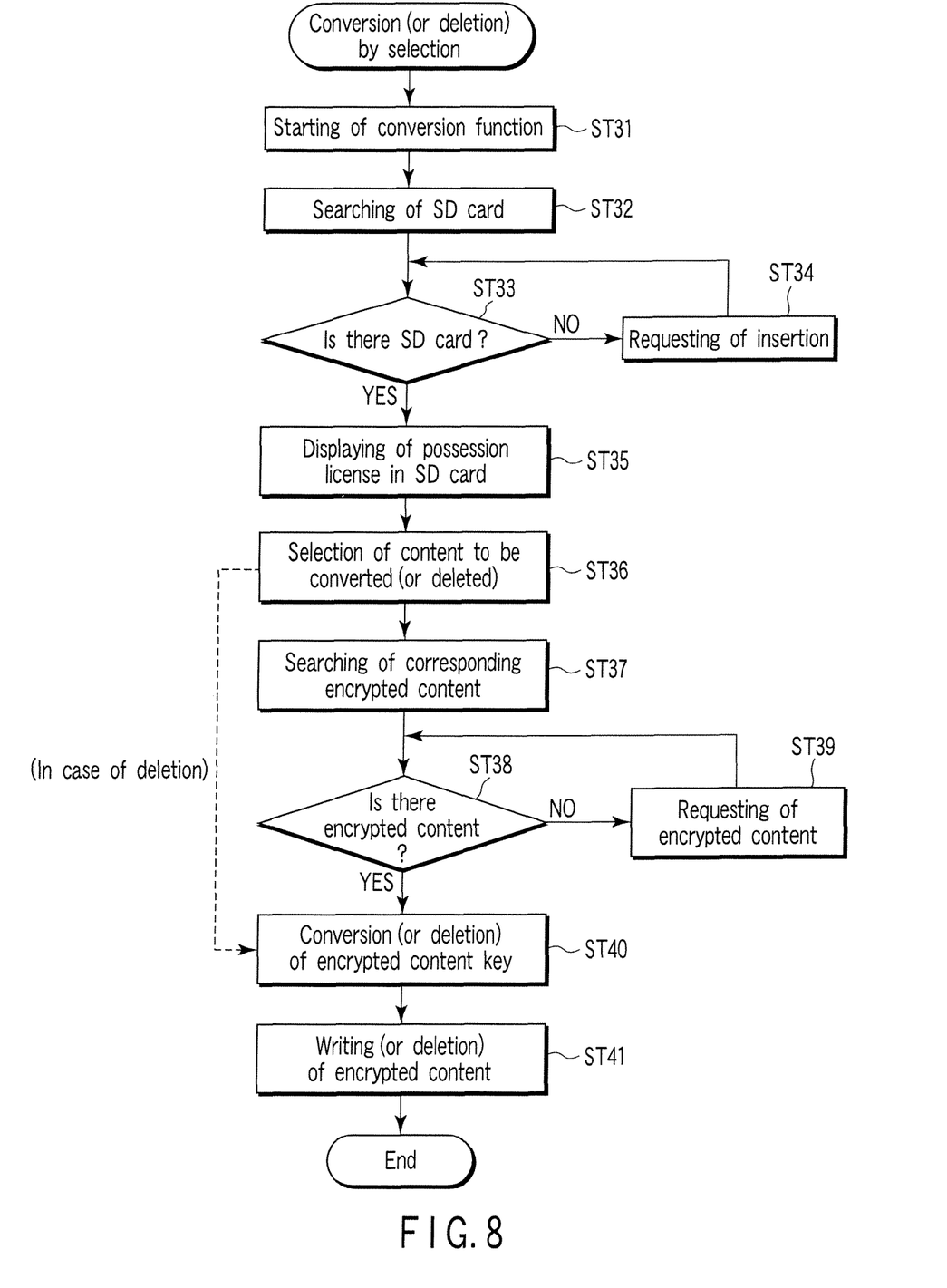
FIG. 8 is a flowchart showing a storage medium conversion method according to a second embodiment of the present invention.

Specifically, a conversion function 24 executes conversion by a procedure shown in a flowchart of FIG. 8. For example, upon a start by user's operation or the like (ST31), the conversion function 24 searches for an SD card SDq (ST32) to determine presence of the SD card SDq (ST33). If the SD card SDq is not present, insertion is requested to return to step ST33 (ST34). If the SD card SDq is present, based on metadata in the SD card SDq, a list of content (possession license) corresponding to a bought encrypted content key is displayed (ST35).

Next, when compatibility is provided, upon selection of content to be converted by user's operation (ST36), the conversion function 24 searches for corresponding encrypted content in a memory 21 (ST37) to determine presence of the encrypted content (ST38). If the encrypted content is not present, encrypted content is requested to return to the step ST38 (ST39). If the encrypted content is present, steps ST1 to ST5c are executed as in the above case to convert an encrypted content key Enc (Ku, Kc) and to write the encrypted content key Enc (Kmu, Kc) corresponding to SD Audio in a protected area of the SD card SDq. Steps ST1 to ST5c do not always need to be executed from the first. For example, when a user key has been decrypted by another processing, steps ST1 to ST5 may be omitted to start from step ST5q.

Subsequently, as in the above case, the conversion function 24 writes the encrypted content Enc (Kc, C) of the memory 21 in a user data area 4 of the SD card SDq.

Accordingly, even when selected by user's operation, the conversion function 24 converts the stored contents of the SD card SDq. In the case of deletion, after content to be deleted is selected by user's selection (ST36), the process proceeds to steps ST40, ST41 to delete a relevant encrypted content key Enc (Kmu, Kc) and relevant encrypted content Enc (Kc, C).

As described above, according to the embodiment, even with the configuration in which the user selects content to be converted or deleted, effects similar to those of the first embodiment can be obtained. As the stored contents of the SD card SDq can be converted off-line without connection to a network 30, it is possible to omit time and labor of accessing a license center device 40.

Third Embodiment

Next, a storage medium conversion method according to a third embodiment of the present invention will be described.

This embodiment is a modified example of the second embodiment in which a conversion start method is changed. That is, according to the second embodiment, the conversion is started by user's selection. On the other hand, according to the embodiment, when a user terminal 20 writes encrypted content Enc (Kc, C) in an SD card SDq by user's operation, conversion of an encrypted content key Enc (Ku, Kc) is started in association with a conversion function 24.

As in the above case, the conversion is carried out by steps ST1 to ST5c. However, when a user key has been decrypted, the process may be started from step ST5q.

Similarly, when the user terminal 20 deletes the encrypted content Enc (Kc, C) from the SD card SDc by user's operation, the conversion function 24 only needs to delete a corresponding encrypted content key Enc (Kmu, Kc) from a protected area 3 of the SD card SDc.

As described above, according to the embodiment, when the user terminal 20 writes or deletes encrypted content in/from user data areas 4 of the SD cards SDq, SDc, the conversion function 24 writes or deletes corresponding encrypted content keys in/from the SD cards SDq, SDc. Thus, not only effects similar to those of the second embodiment can be obtained but also compatibility can be provided without any special operations. Moreover, as compatibility is provided or canceled in response to writing or deletion of the encrypted content, it is possible to improve convenience.

Fourth Embodiment

Next, a storage medium conversion method according to a fourth embodiment of the present invention will be described.

This embodiment is a modified example of the first to third embodiments in which conversion content of an encrypted content key is changed. That is, according to the first to third embodiments, as shown in FIG. 6, the same content key Kc is used for the encrypted content key Enc (Ku, Kc) before the conversion and the encrypted content key Enc (Kmu, Kc) after the conversion. On the other hand, according to this embodiment, as shown in FIG. 9, different content keys Kc, Kct are used for an encrypted content key Enc (Ku, Kc) before conversion and an encrypted content key Enc (Kmu, Kct) after conversion.

The content key Kct used after the conversion is prepared by updating key numerical value data of a content key Kc before the conversion to another value.

Figure 9:
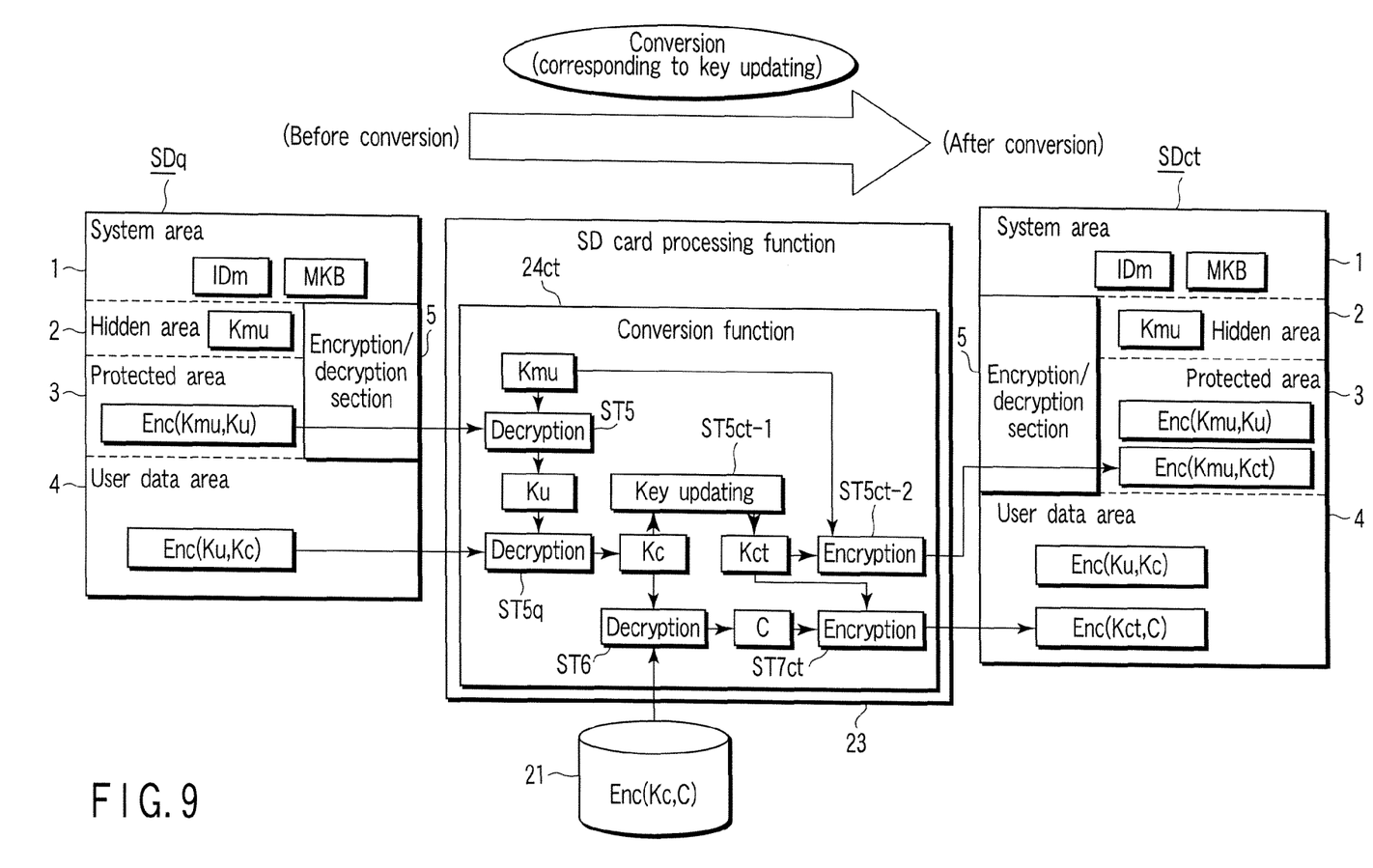
FIG. 9 is an explanatory schematic diagram showing conversion processing according to a fourth embodiment of the present invention.

That is, as shown in FIG. 9, upon updating of key numerical value data to another value (ST5ct-1), the content key Kc decrypted in step ST5q becomes a content key Kct, and is then encrypted by a media unique key Kmu (ST5ct-2) to be written as encrypted content Enc (Kmu, Kct) in a protected area 3.

Subsequently, the encrypted content Enc (Kc, C) is decrypted, and then encrypted by a content key Kct (ST6 to ST7ct) to be written as updated encrypted content Enc (Kct, C) in a user area 4.

Figure 10:
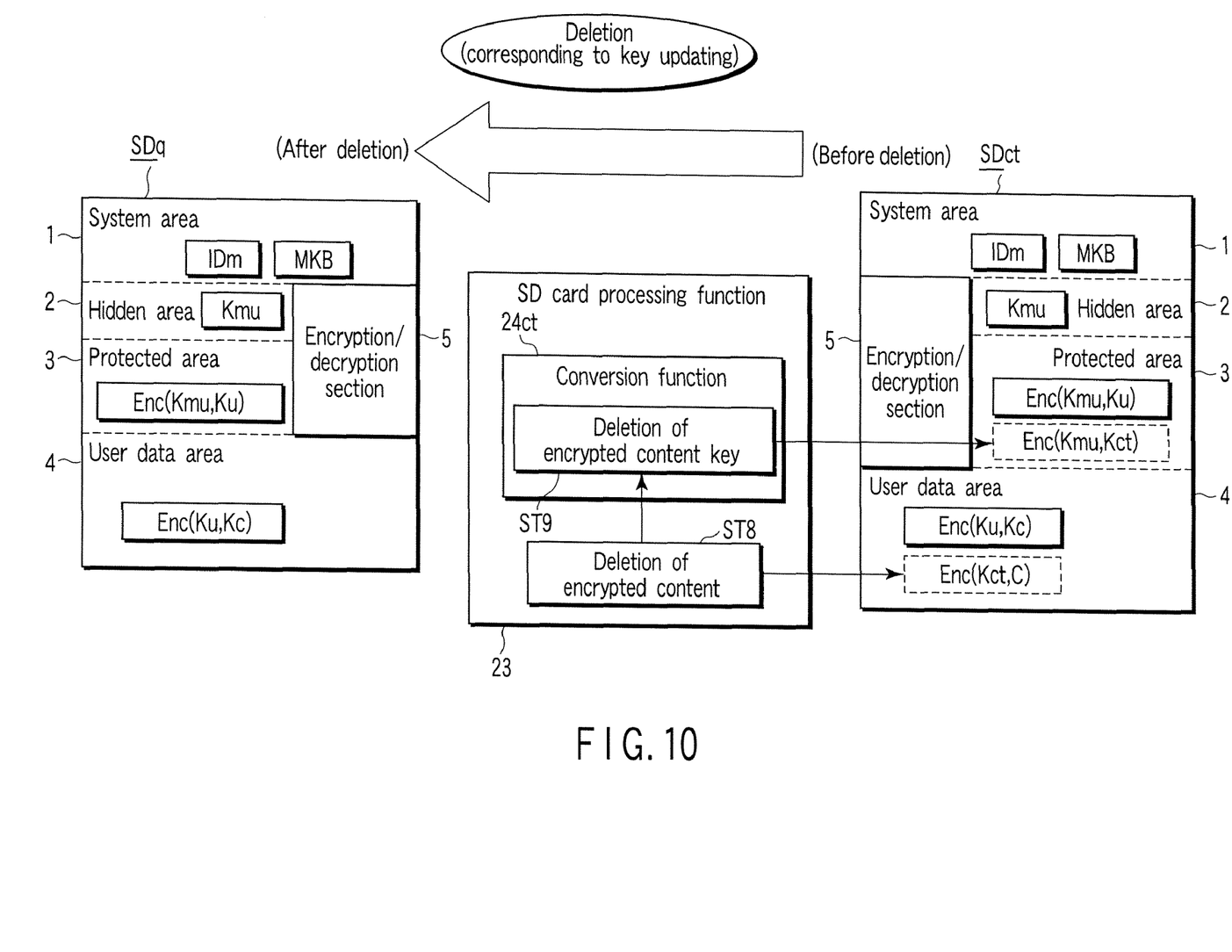
FIG. 10 is an explanatory schematic diagram showing deletion processing according to the embodiment.

On the other hand, in the case of deletion, as shown in FIG. 10, as in the above case, the encrypted content Enc (Kct, C) and the encrypted content key Enc (Kmu, Kct) are simultaneously or individually deleted.

Even with this configuration, effects similar to those of the first to third embodiments can be obtained, and compatibility can be provided by the updated content key Kct.

The method exhibited in each above-mentioned embodiment can be distributed as a computer executable program by storing into a storage medium such as a magnetic disk (floppy [trade mark] disk, hard disk, etc.), an optical disk (CD-ROM, DVD, etc.), a magnet-optical disk (MO) and a semiconductor memory.

Regardless of type of storage format, any storage medium capable of storing the program and being read by the computer is usable as the storage medium for this program.

An operating system (OS) or middleware (MW) such as a database management software and a network software running on the computer, based on the instruction installed in the computer from the storage medium, may executes a part of each processing to achieve each above-described embodiment.

The storage medium for the invention is not limited to a medium independent from the computer, and includes the storage medium with a program transmitted via a LAN, the Internet, etc., downloaded and stored or temporarily stored thereon.

The number of the storage medium for the invention is not limited only one, and the storage medium of the invention includes the case that processing in each embodiment is respectively executed by means of a plurality of media, and any structure of the medium is acceptable.

The computer in the invention executes each processing in each above mentioned embodiment, based on the program stored in the storage medium. Any configuration of the computer such as a device composed of a single personal computer, etc., and a system composed of a plurality of devices network-connected therein are available.

The computer in the invention is not limited to a personal computer, and includes computing processing device, a micro-computer, etc., included in information processing equipment and generically means equipment and a device capable of achieving the functions of the invention.

The invention in its broader aspects is not limited to the specific details and representative embodiments shown and described herein, and can be embodied in their implementation phases by modifying constituent components without departing from the spirit or scope of the general inventive concept of the invention. A variety of modifications of the invention may be made by appropriate combinations of a plurality of constituent components shown in each foregoing embodiment. For example, some constituent components may be omitted from the whole of the constituent components shown in each embodiment. Furthermore, the constituent components over different embodiments can be appropriately combined.

As described above, according to the storage medium conversion method, a program and a device of the present invention, it is possible to realize compatibility between the encryption dual key system and the other encryption (single) key system.

What is claimed is:

1. A storage medium conversion method for causing a user terminal to convert stored contents of a first memory comprising a first user data area and a first protected area where authentication between a host and the storage medium is required for access to the first protected area, in a manner of providing compatibility between, a first encryption system which uses the first memory for prestoring media identifier data, media unique key data generated based on the media identifier data, encrypted user key data stored in the first protected area and obtained by encrypting user key data in a decryptable manner based on the media unique key data, and first encrypted content key data stored in the first user data area and obtained by encrypting content key data in a decryptable manner based on the user key data, and the user terminal for storing first encrypted content obtained by encrypting content data in a decryptable manner based on the content key data, and a second encryption system which uses a second memory for storing, different from the first encryption system, encrypted title key data stored in a second protected area and obtained by encrypting title key data equivalent to the content key data in a decryptable manner based on the media unique key data, and second encrypted content obtained by encrypting the content data in a decryptable manner based on the title key data, the method comprising:

generating the media unique key data based on the media identifier data read from the first memory;

decrypting the encrypted user key data read from the first memory based on the media unique key data to obtain user key data;

decrypting the first encrypted content key data read from the first memory based on the user key data to obtain content key data;

encrypting the content key data in a decryptable manner based on the media unique key data, thereby obtaining second encrypted content key data equivalent to the encrypted title key data;

writing the second encrypted content key data in the first memory; and writing the first encrypted content in the first memory.

2. The method according to claim 1, further comprising:
writing first encrypted content key data downloaded from the outside; and
starting acquisition of at least the content key data corresponding to the written first encrypted content key data.

3. The method according to claim 1, further comprising:
selecting content of a target to be provided with the compatibility by an operation from the outside; and
starting acquisition of at least the content key data corresponding to the selected content.

4. The method according to claim 1, further comprising:
starting writing of the first encrypted content in the first memory by an operation from the outside; and
starting acquisition of at least the content key data corresponding to the first encrypted content after the writing.

5. The method according to claim 1, wherein the writing of the second encrypted content key data in the first memory includes:
deleting second encrypted content key data stored first in the first memory when the number of second encrypted content key data or a data volume stored in the first memory reaches a reference value before the writing; and
executing the writing after the deleting.

6. The method according to claim 1, wherein:
the content key data contains usage rule information regarding copying and movement, and
the acquisition of the second encrypted content key data includes updating the usage rule information to indicate copying inhibition and movement inhibition, and encrypting the updated content key data based on the media unique key data.

7. The method according to claim 1, wherein:
the content key data contains key numerical value data, and
the acquisition of the second encrypted content key data includes updating the key numerical value data to another value, and encrypting the updated content key data based on the media unique key data.

8. The method according to claim 1, further comprising:
selecting content to be deleted by an operation from the outside; and
deleting the second encrypted content data and the first encrypted content from first memory corresponding to the selected content.

9. The method according to claim 1, further comprising:
deleting the first encrypted content from the first memory by an operation from the outside; and
deleting the second encrypted content key data from the first memory corresponding to the deleted first encrypted content.

10. A non-transitory computer readable storage medium storing program instructions which when executed by a computer of a user terminal converts stored contents of a first memory comprising a first user data area and a first protected area where authentication between a host and the first memory is required for access to the first protected area, in a manner of providing compatibility between,
a first encryption system which uses the first memory for prestoring media identifier data, media unique key data generated based on the media identifier data, encrypted user key data stored in the first protected area and obtained by encrypting user key data in a decryptable manner based on the media unique key data, and first encrypted content key data obtained by encrypting content key data stored in the first user data area and in a decryptable manner based on the user key data, and the user terminal for storing first encrypted content obtained by encrypting content data in a decryptable manner based on the content key data, and
a second encryption system which uses a second memory for storing, different from the first encryption system, encrypted title key data stored in a second protected area and obtained by encrypting title key data equivalent to the content key data in a decryptable manner based on the media unique key data, and second encrypted content obtained by encrypting the content data in a decryptable manner based on the title key data,
the program instructions comprising:
first program code for causing the computer to execute processing of generating the media unique key data based on the media identifier data read from the first memory;
second program code for causing the computer to execute processing of decrypting the encrypted user key data read from the first memory based on the media unique key data to obtain user key data;
third program code for causing the computer to execute processing of decrypting the first encrypted content key data read from the first memory based on the user key data to obtain content key data;
fourth program code for causing the computer to execute processing of encrypting the content key data in a decryptable manner based on the media unique key data, thereby obtaining second encrypted content key data equivalent to the encrypted title key data;
fifth program code for causing the computer to execute processing of writing the second encrypted content key data in the first memory; and
sixth program code for causing the computer to execute processing of writing the first encrypted content in the first memory.

11. The non-transitory computer readable storage medium according to claim 10, further comprising:
seventh program code for causing the computer to execute processing of writing first encrypted content key data downloaded from the outside; and
eighth program code for causing the computer to execute processing of starting acquisition of at least the content key data corresponding to the written first encrypted content key data.

12. The non-transitory computer readable storage medium according to claim 10, further comprising:
seventh program code for causing the computer to execute processing of selecting content of a target to be provided with the compatibility by an operation from the outside; and
eighth program code for causing the computer to execute processing of starting acquisition of at least the content key data corresponding to the selected content.

13. The non-transitory computer readable storage medium according to claim 10, further comprising:
seventh program code for causing the computer to execute processing of starting writing of the first encrypted content in the first memory by an operation from the outside; and
eighth program code for causing the computer to execute processing of starting acquisition of at least the content key data corresponding to the first encrypted content after the writing.

14. The non-transitory computer readable storage medium according to claim 10, wherein the processing of writing the second encrypted content key data in the first storage medium includes:
processing of deleting second encrypted content key data stored first in the first memory when the number of second encrypted content key data or a data volume stored in the first memory reaches a reference value before the writing; and
processing of executing the writing after the deleting.

15. The program according to claim 10, wherein:
the content key data contains usage rule information regarding copying and movement, and
the processing of obtaining the second encrypted content key data includes processing of updating the usage rule information to indicate copying inhibition and movement inhibition, and processing of encrypting the updated content key data based on the media unique key data.

16. The non-transitory computer readable storage medium according to claim 10, wherein:

the content key data contains key numerical value data, and the processing of obtaining the second encrypted content key data includes processing of updating the key numerical value data to another value, and processing of encrypting the updated content key data (Kct) based on the media unique key data.

17. The non-transitory computer readable storage medium according to claim 10, further comprising:

seventh program code for causing the computer to execute processing of selecting content to be deleted by an operation from the outside; and eighth program code for causing the computer to execute processing of deleting the second encrypted content data and the first encrypted content from the first memory corresponding to the selected content.

18. The non-transitory computer readable storage medium according to claim 10, further comprising:

seventh program code for causing the computer to execute processing of deleting the first encrypted content from the first storage medium by an operation from the outside; and eighth program code for causing the computer to execute processing of deleting the second encrypted content key data from the first memory corresponding to the deleted first encrypted content.

19. An electronic device capable of decrypting content encrypted based on content key data, comprising:

a holding device configured to detachably hold a storage medium having a first area for storing media identifier data, a second area for storing media unique key data generated in connection with the media identifier data, a third area for storing encrypted user key data obtained by encrypting user key data in a decryptable manner based on the media unique key data, where an authentication between a host and the storage medium is required for access to the third area, and a fourth area for storing content key data encrypted based on the user key data;

a first writing device configured to write content encrypted based on the content key data in the fourth area of the storage medium;

a second writing device configured to write the content key data encrypted based on the media unique key data generated in connection with the media identifier data in the third area in response to the writing by the first writing device;

a first deleting device configured to delete the encrypted content in the fourth area by an operation from the outside; and a second deleting device configured to delete the content key data encrypted based on the media unique key data from the third area in response to the deletion by the first deleting device.

\* \* \* \* \*